US012027797B2

(12) United States Patent
Smith et al.

(10) Patent No.: US 12,027,797 B2
(45) Date of Patent: Jul. 2, 2024

(54) HIGH VOLTAGE ADAPTER

(71) Applicant: SAAB AB, Linköping (SE)

(72) Inventors: David Smith, Gothenburg (SE); Henrik Sundbäck, Gothenburg (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/262,089

(22) PCT Filed: Jan. 17, 2022

(86) PCT No.: PCT/SE2022/050046
§ 371 (c)(1),
(2) Date: Jul. 19, 2023

(87) PCT Pub. No.: WO2022/159017
PCT Pub. Date: Jul. 28, 2022

(65) Prior Publication Data

US 2024/0039208 A1 Feb. 1, 2024

(30) Foreign Application Priority Data

Jan. 20, 2021 (SE) .................................... 2100008-8

(51) Int. Cl.
*H01R 13/53* (2006.01)
*H01R 13/52* (2006.01)
*H01R 31/06* (2006.01)

(52) U.S. Cl.
CPC ......... *H01R 13/53* (2013.01); *H01R 13/5205* (2013.01); *H01R 31/06* (2013.01)

(58) Field of Classification Search
CPC ..... H01R 13/53; H01R 13/5205; H01R 31/06
See application file for complete search history.

(56) References Cited

U.S. PATENT DOCUMENTS 4,857,021 A * 8/1989 Boliver .................. H01R 13/53 439/813
5,277,605 A 1/1994 Roscizewski et al.
(Continued)

FOREIGN PATENT DOCUMENTS

DE 19525122 A1 1/1997
DE 102007003636 A1 7/2008
(Continued)

OTHER PUBLICATIONS

International Searching Authority, International Search Report and Written Opinion received for International Application No. PCT/SE2022/050046, dated Feb. 28, 2022, 10 pages, Swedish Patent and Registration Office, Sweden.
(Continued)

*Primary Examiner* — Thanh Tam T Le
(74) *Attorney, Agent, or Firm* — Alston & Bird LLP

(57) ABSTRACT

The present disclosure relates to a high voltage adapter (1) for insertion into an adapter socket (2) in a high voltage unit (10), the adapter (1) comprises an oblong cylindrical main body (3) having a first outer diameter (D1), the main body (3) comprising a first circumferential portion (3'), the first circumferential portion (3') having a second outer diameter (D2), wherein the second outer diameter (D2) is greater than the first outer diameter (D1). Further, the adapter (1) comprises a first threaded female portion (4) extending from a first base (5) of the main body (3) and a second threaded female portion (6) extending from an opposing second base (7) of the main body (3), each threaded female portion (4, 6) extending perpendicular to each corresponding base (5, 7) into the main body (3). Moreover, each threaded female portion (4, 6) is arranged to receive a threaded male connector (17, 18), so to transfer voltage signals from a first environment to a second environment. Also, the female
(Continued)

portions (4, 6) extend towards each other and are separated by an inner wall (9).

10 Claims, 6 Drawing Sheets

(56) References Cited

U.S. PATENT DOCUMENTS

| | | | | |
|---|---|---|---|---|
| 5,525,069 | A * | 6/1996 | Roscizewski | H01R 13/53 439/184 |
| 7,491,075 | B2 * | 2/2009 | Hughes | H01R 13/53 439/184 |
| 7,556,540 | B2 * | 7/2009 | Siebens | H01R 13/53 439/801 |
| 7,642,465 | B2 * | 1/2010 | Meyer | H01R 13/53 439/486 |
| 7,870,668 | B2 * | 1/2011 | Hughes | H01R 13/53 439/805 |
| 8,070,501 | B2 * | 12/2011 | Kumar | H01R 13/53 439/186 |
| 8,764,467 | B2 * | 7/2014 | Lee | H01R 13/53 439/181 |
| 9,112,322 | B2 * | 8/2015 | Siebens | H01R 13/17 |
| 9,350,103 | B2 * | 5/2016 | Siebens | H01R 24/20 |
| 9,437,374 | B2 * | 9/2016 | Siebens | H01H 9/12 |
| 9,954,315 | B2 * | 4/2018 | Siebens | H01R 13/53 |
| 10,348,046 | B2 * | 7/2019 | Alberdi Celaya | H01R 31/06 |
| 2009/0100675 | A1 * | 4/2009 | Hughes | H01R 13/6599 29/887 |

FOREIGN PATENT DOCUMENTS

| | | | |
|---|---|---|---|
| EP | 1339145 | A1 | 8/2003 |
| EP | 2654133 | A1 | 10/2013 |
| EP | 3229323 | A1 | 10/2017 |

OTHER PUBLICATIONS

Swedish Patent and Registration Office, Search Report received for Application No. SE 210008-8, dated Aug. 31, 2021, 2 pages, Sweden.

* cited by examiner

HIGH VOLTAGE ADAPTER

CROSS REFERENCE TO RELATED APPLICATIONS

This application is a National Stage Application, filed under 35 U.S.C. 371, of International Application No. PCT/SE2022/050046, filed Jan. 17, 2022, which international application claims priority to and the benefit of Swedish Application No. 2100008-8, filed Jan. 20, 2021; the contents of both of which as are hereby incorporated by reference in their entireties.

TECHNICAL FIELD

The present disclosure relates to a high voltage adapter, a system comprising a high voltage adapter and a method for manufacturing a high voltage adapter.

BACKGROUND

In high voltage applications involving the transfer of high voltage signals from a first environment to a second environment such as the transfer of high voltage signals from air to an oil filled unit, adapters are conventionally utilized to facilitate the transfer of the voltage signals. Accordingly, the adapters act as a transferring mean between the two mediums. For example a circuit board may be configured to transfer signals to a transformer unit. Thus, an adapter should preferably be arranged to transfer the signals to prevent arcing from the high voltage but also to function as a hermetic seal e.g. for the transformer oil inside the unit. A unit e.g. a transformer unit may have a plurality of adapters mounted to it.

An optimal adapter is designed so to have a small footprint that allows it to be space efficient when mounted to a unit. Further an adapter should preferably be convenient and cheap to manufacture, mount and provide a sufficient functioning. The adapter should function in a manner that allows it to minimize arcing and seal the unit it is mounted to efficiently.

Adapters in the present art don't fulfil the abovementioned requirements. Adapters in the present art are usually expensive, long lead items that are difficult to mount and have a large footprint.

Thus, there is room in the present art to explore the domain of providing a system allowing for the transfer of signals between two environments, the system being safe, compact and convenient to manufacture. More specifically the system should provide an adapter with small footprint having simplicity in design, mounting and manufacturing compared to previous solutions. There is specifically a need in the present art for improved adapters for high voltage applications being cost-efficient, efficiently designed and having simplified manufacturing and mounting.

Even though some currently known solutions work well in some situations it would be desirable to provide an adapter for high voltage applications that fulfils requirements related to improving the cost-efficiency, design efficiency, mounting and the manufacturing of adapters.

SUMMARY

It is therefore an object of the present disclosure to provide an adapter, a method for manufacturing a high voltage unit comprising an adapter and a system comprising an adapter to mitigate, alleviate or eliminate one or more of the above-identified deficiencies and disadvantages.

This object is achieved by means of an adapter, a method and a system as defined in the appended claims.

The present disclosure is at least partly based on the insight that by providing an improved adapter, a system comprising said adapter and a method for manufacturing such, transferring voltage and/or current signals from a first environment to a second environment will become more efficient, and further, the applications that perform these operations will be improved in terms of cost-efficiency, assembly and manufacturing.

In accordance with the disclosure there is provided an adapter, a method and a system in accordance with the appended claims.

The present disclosure discloses a high voltage adapter for insertion into an adapter socket in a high voltage unit, the adapter comprising an oblong cylindrical main body having a first outer diameter. The main body comprising a first circumferential portion, the first circumferential portion having a second outer diameter, wherein the second outer diameter is greater than the first outer diameter. Moreover, the adapter comprises a first threaded female portion extending from a first base of the main body and a second threaded female portion extending from an opposing second base of the main body, each threaded female portion extending perpendicular to each corresponding base into the main body. Furthermore, each threaded female portion is arranged to receive a threaded male connector, so to transfer voltage signals from a first environment to a second environment.

The threaded female portions extend towards each other and are separated by an inner wall, wherein the adapter may be arranged to be inserted in a high voltage unit by means of press-fit. In some embodiments the adapter may be screwed into the high voltage unit.

A benefit of the adapter is that it comprises a small footprint, i.e. the adapter having two threaded female portions combined results in an adapter that is compact in shape. Further, the adapter will be space-efficient when mounted to a unit. Based on that the adapter is arranged to be fully inserted, it allows for a convenient mounting of the adapter to a high voltage unit. Accordingly, the adapter in accordance with the present disclosure is efficiently arranged for mounting and manufacturing while having a small footprint. Moreover, the adapter fulfil other requirements such as to prevent arcing from the high voltage. Accordingly, the present disclosure provides an adapter that is convenient to mount, convenient to manufacture, comprises a small footprint and is customizable in manufacturing.

The adapter may be suitable to transfer voltage/current signals from a circuit board, e.g. a printed circuit board to a transformer unit having a plastic frame, wherein the transformer unit comprises transformer oil within said plastic frame. In other words, the adapter may be inserted in a socket in said plastic frame. This allows for an efficient press-fit mounting of the adapter. By having a metal adapter combined adapter sockets being of a plastic frame, the adapters may deform the sockets (which preferably are in a similar, slightly smaller or slightly larger diameter than the corresponding parts of the adapter) so to fasten the adapter properly in an adapter socket.

The adapter may further comprise an annular cavity at a second circumferential portion around the main body, wherein the annular cavity is arranged to receive a sealing means to surround the circumference of said annular cavity. The annular cavity may comprise a sealing means mounted to circumfuse the annular cavity. The sealing means may be made of rubber, silicone or any other suitable material. The annular cavity may be arranged on any suitable position around the main body.

The annular cavity may allow the adapter to be hermetically sealed to the socket which it is mounted.

The adapter may comprise an insertion length defining a portion of the length of the adapter that is disposed within an adapter socket of a high voltage unit when said adapter is inserted into said adapter socket, wherein the insertion length of the adapter is at least 90% of the length of the adapter. The insertion length may be 100% of the length of the adapter.

A benefit of this is that it allows a large portion of the length of the adapter to be inserted in a socket which allows for a compactly mounted adapter without any protruding parts.

Particularly, when the adapter is associated with a printed circuit board (PCB), an arrangement with an insertion length in accordance with the present disclosure allows for the unit to optimize space on and around the PCB for other components.

The adapter may be arranged to transfer voltage signals of up to 30 kV. The adapter may transfer voltage signals from 4 V up to 30 kV.

A distance between end-points of the first threaded female portion and the second threaded female portion is 1.01-1.5 times greater than an inner diameter of the first or second threaded female portion. This allows for a sufficient functioning of the adapter while minimizing the size of the adapter.

Furthermore, the adapter may be a metal adapter so to transfer voltage and/or current signals. The adapter may be a stainless steel adapter.

The adapter may have a length being in the range of 15-40 mm, wherein the second outer diameter may be 7-15 mm. Accordingly, the adapter may be adapted for being associated with a unit on a printed circuit board (PCB).

The second outer diameter of the adapter may be 55-75% greater than the first outer diameter. This correlation between the first and the second outer diameter allows for the adapter to be efficiently designed in size while it allows the adapter to have a large part of its body within a high voltage unit.

The high voltage adapter may be arranged to be inserted in sockets of a high voltage unit, wherein the sockets are formed in a polymer material e.g. plastic. Accordingly, the adapter may be optimized to be inserted (by means of press-fit) into plastic sockets of a high voltage system and/or an oil-filled system. The sockets of the high voltage unit may in other words have a corresponding shape to the adapter, so that the adapter may be sleeved in the unit.

There is also disclosed a method for manufacturing a high voltage unit comprising at least one adapter, the method comprising providing a high voltage unit comprising adapter sockets, the sockets being arranged to receive an adapter. The method also comprising the step of forming said adapter (according to the present disclosure). Also, the method comprises the step of inserting said metal body into said adapter socket, such that when inserted, at least 90% of a length of said metal body is disposed within said adapter socket. Preferably 98-100% of the length of said metal body is disposed within said adapter socket. The adapter socket may be the adapter socket in accordance with any embodiment of the present disclosure.

Furthermore, there is provided a system comprising at least one high voltage adapter, a high voltage unit comprising at least one adapter socket and at least a first and a second threaded male connector arranged to be fastened to the adapter so to transfer voltage and/or current signals from a first environment to a second environment e.g. from air to an oil filled environment or vice versa. The adapter comprises an oblong cylindrical main body having a first outer diameter, the main body comprising a first circumferential portion, the first circumferential portion having a second outer diameter, wherein the second outer diameter is greater than the first outer diameter. Further, the adapter comprises a first threaded female portion extending from a first base of the main body and a second threaded female portion extending from an opposing second base of the main body, each threaded female portion extending perpendicular to each corresponding base into the main body. The inner portions of the adapter extend towards each other and are separated by an inner wall. Each of the at least one adapters may, by means of press-fit, be arranged in said at least one adapter socket of said high voltage unit such that at least 90% of the length of each adapter is disposed within said adapter socket. The first and the second threaded male connector are configured to be fastened in said first and second female portion of the at least one adapter, so to transfer voltage signals from a first environment to a second environment.

The system may in some embodiments comprise at least a first and a second adapter, wherein the unit comprises a first and a second adapter socket.

BRIEF DESCRIPTION OF THE DRAWINGS

In the following the disclosure will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided adapter, system and method, it will be apparent to one skilled in the art that the adapter, system and method may be realized without these details. In other instances, well known constructions or functions are not described in detail, so as not to obscure the present disclosure. It should be noted that the present disclosure uses the term high voltage. However it may also be suitable for high current. Thus the adapter may be a high current adapter and the system may be configured to transfer high voltage and/or high current to/from a first environment to a second environment.

A product operating with high voltage/current levels and that is connected to the adapter as disclosed herein may be (particularly if they operate with voltage levels above 10 kv) enclosed in an oil-filled unit (thus, what is referred to as 'high voltage unit' within the present disclosure may be an oil-filled unit), such an oil-filled unit is preferably sealed so to not leak any oil, and additionally is required to have some means for transferring high voltage signals which may be a purpose of the adapter in accordance with the present disclosure (i.e. to transfer signals between to environments which may have different mediums). Accordingly, a power signal may be transferred from/to a high voltage unit (e.g. an oil-filled unit) comprising a frame (unit) having an adapter socket and an adapter to transfer signals to/from said high voltage unit. For example, a transformer may be in oil within said frame which transforms an incoming power signal and output the power signal as a high voltage signal out from the high voltage unit. Thus, the adapter may transfer power signals to/from an environment filled with air to an environment filled with oil.

Figure 1A:
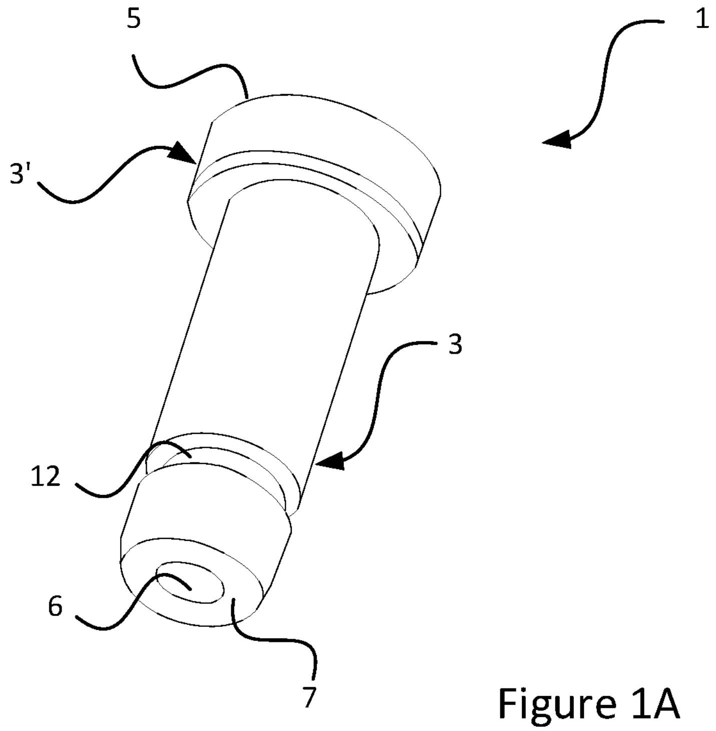
FIG. 1A illustrates an objective view of an adapter, in accordance with an embodiment of the present disclosure
Figure 1B:
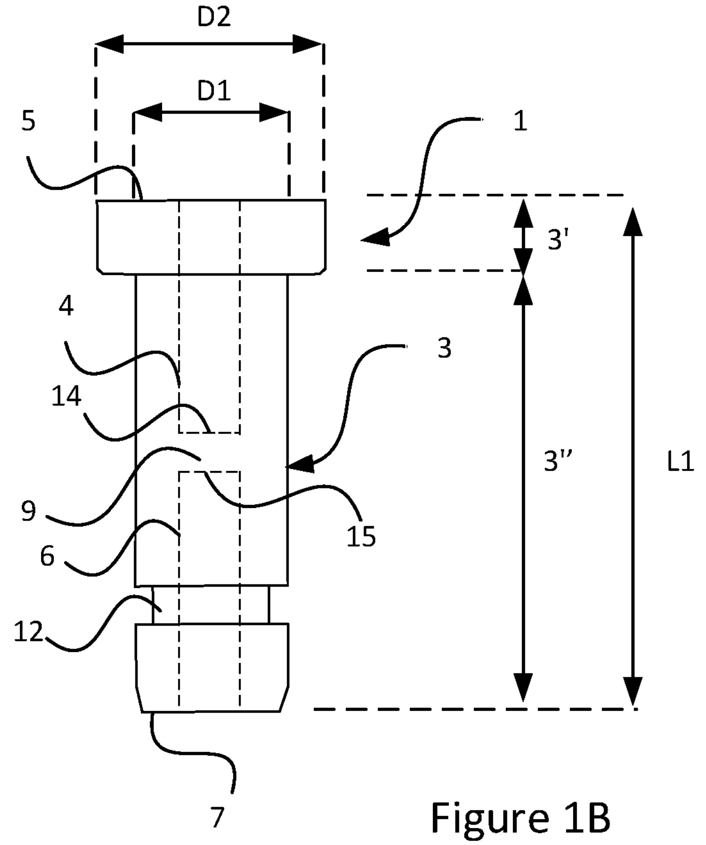
FIG. 1B illustrates a side view of an adapter in accordance with an embodiment of the present disclosure

The FIGS. 1A-1B illustrate a high voltage adapter 1 in accordance with an embodiment of the present disclosure. More specifically, FIG. 1A illustrates a high voltage adapter 1 from an objective view and FIG. 1B illustrates the high voltage adapter 1 from a side-view. Thus, FIGS. 1A-1B show a high-voltage adapter 1 for insertion into an adapter socket 2 in a high voltage unit 10 (shown in FIGS. 3-5). Preferably, the adapter 1 is for insertion into a connector socket 2 in a high voltage unit 10, so to transfer voltage signals from/to an electrical component, a PCB or other unit to/from the high voltage unit 10.

The high voltage adapter 1 comprises an oblong cylindrical main body 3 having a first outer diameter D1, the main body 3 comprises an first circumferential portion 3', the first circumferential portion 3' having a second outer diameter D2, wherein the second outer diameter D2 is greater than the first outer diameter D1 (D1 and D2 shown in FIG. 1B). Further, the adapter 1 comprises a first threaded female portion 4 extending from a first base of the main body 3 and a second threaded female portion 6 extending from an opposing second base 7 of the main body 3. Moreover, each threaded female portion 4, 6 extends perpendicular to each corresponding base 5, 7 into the main body 3. Furthermore, each threaded female portion 4, 6 is arranged to receive a threaded male connector 17, 18 (shown in FIG. 5), so to transfer voltage signals from a first environment to a second environment. The first environment may be an environment filled with air and the second environment may be an oil-filled environment.

Furthermore, FIG. 1A-1B illustrates that the female portions 4, 6 extend towards each other and are separated by an inner wall 9. Furthermore, the adapter 1 may be inserted in a high voltage unit 10 by means of press-fit. The adapter 1 is preferably arranged such that the first and the second female portions 4, 6 receive a connector.

A benefit of the adapter 1 is that it has a small footprint, i.e. the adapter 1 is compact in shape, and space-efficient when mounted to a unit 10. The female portions 4, 6 of the adapter 1 allows it to be mounted in a manner which results in that the adapter 1 doesn't have any protruding parts when mounted to a unit 10 (shown in FIGS. 3-5). Furthermore, the adapter 1 having two diameters D1, D2 allows it to be press-fit mounted to a unit 10. Accordingly, the adapter 1 in accordance with the present disclosure is efficiently arranged for mounting and manufacturing (convenient and cheap manufacturing) while having a small footprint. Moreover, the adapter 1 may fulfil other requirements such as to prevent arcing from the high voltage/current.

The adapter 1 may be well arranged to transfer voltage/current signals from a circuit board, e.g. a printed circuit board to a transformer unit having a plastic frame, wherein the transformer unit comprises transformer oil within said plastic frame. In other words, the adapter 1 may be inserted in a socket in said plastic frame/unit 10 (shown in FIGS. 3-5).

FIGS. 1A-1B further illustrates that the adapter 1 further comprises an annular cavity 12 at a first circumferential portion 3' around the main body 3, wherein the annular cavity 12 is arranged to receive a sealing means 13 (shown in FIGS. 2A-2B) to surround the circumference of said annular cavity 12. The sealing means 13 may be an o-ring. The sealing means 13 may be rubber, silicone or any other suitable deformable material.

A distance between end-points 14, 15 of the first threaded female portion 4 and the second threaded female portion 6 is 1.01-1.5 times greater than an inner diameter of the first or second threaded female portion 4, 6. The range defines an optimal correlation that allows the adapter 1 to function properly while minimizing the size of the adapter 1 so to obtain a more compactly designed adapter 1. The term "end-point" refers to a point 14, 15 in each threaded female portion 4, 6 that defines the smallest distance to the other threaded female portion 4, 6.

Further, the second outer diameter D2 may be 55-75% greater than the first outer diameter D1. Such a correlation between the first and the second diameter D1, D2 allow for the adapter 1 to be inserted by means of press-fit while being compact in size. In other words, the adapter 1 in accordance with the present disclosure is configured to transfer high voltage signals from a first environment to a second environment while being compact in size and mounting.

Figure 2A:
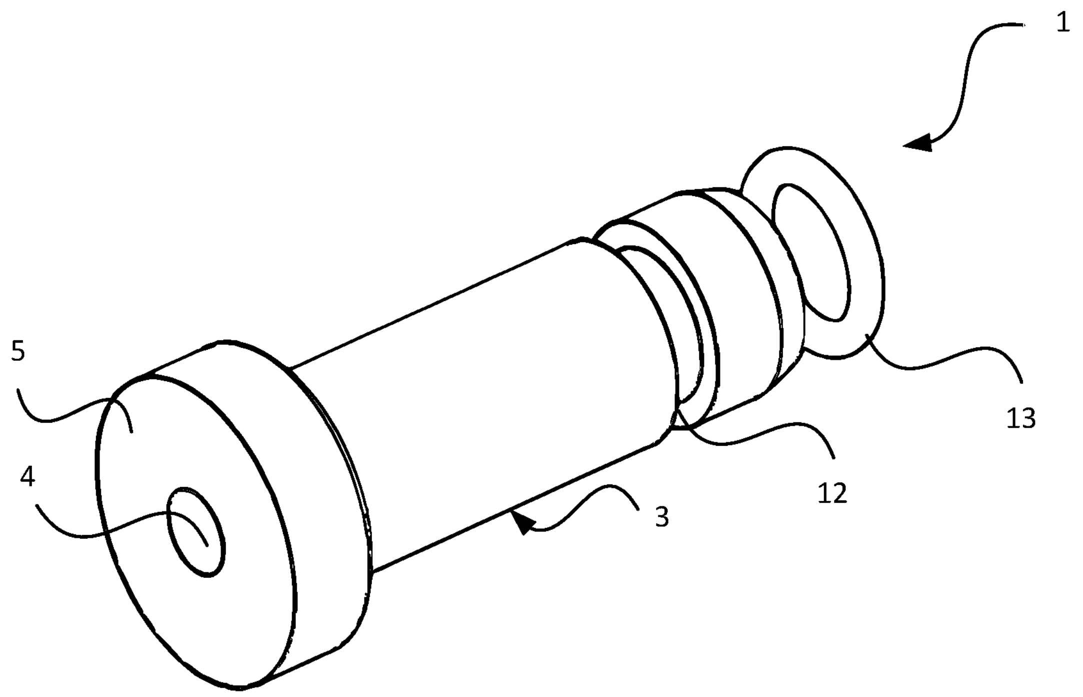
FIG. 2A illustrates an exploded objective view of an adapter and a sealing means
Figure 2B:
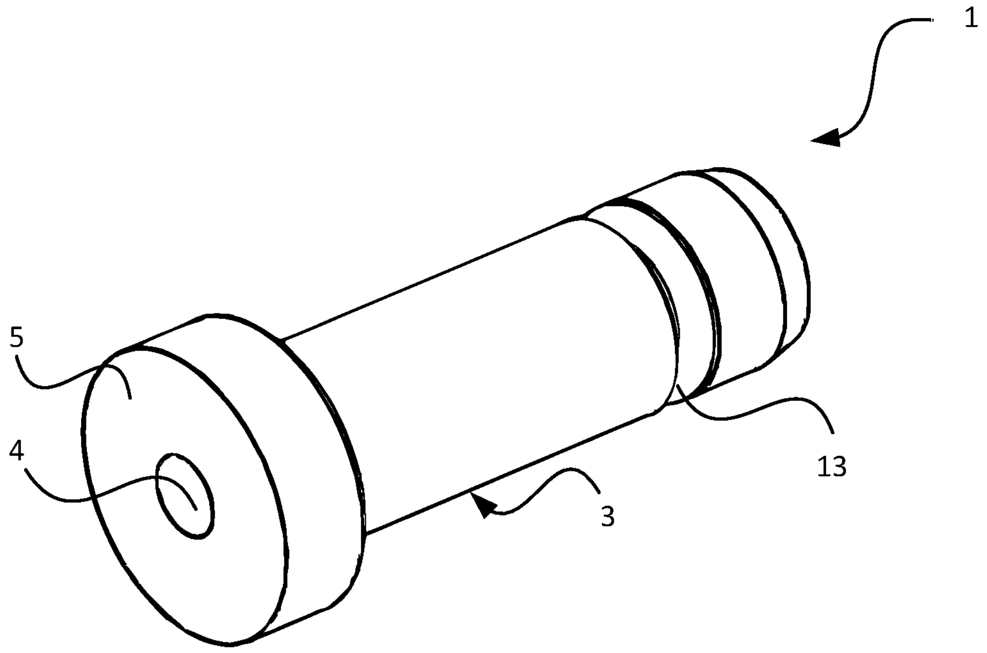
FIG. 2B illustrates an objective view of an adapter and a mounted sealing means

FIGS. 2A and 2B illustrates the adapter 1 comprising a sealing means 13 from two views. FIG. 2A shows the adapter 1 and an exploded sealing means 13. FIG. 2B shows the adapter 1 and a mounted sealing means 13. As seen in FIG. 2B the sealing means 13 is mounted in the annular cavity 12 of the adapter 1. The sealing means 13 may be an o-ring or any other suitable sealing means 13. The sealing means 13 may be of a deformable material such as rubber, silicone or any other suitable deformable material. The sealing means 13 may have a thickness such that when arranged in the annular cavity 12 it has a larger diameter than the first outer diameter D1.

The sealing means 13 as seen in FIGS. 2A and 2B allows for the adapter 1 to be hermetically sealed when arranged in an adapter socket 2.

The adapter 1 as shown in the FIGS. 1A-2B may be arranged to transfer voltage signals of up to 30 kV. Further, the adapter 1 may be a metal adapter. In some embodiments the adapter 1 is made of stainless steel.

Figure 3A:
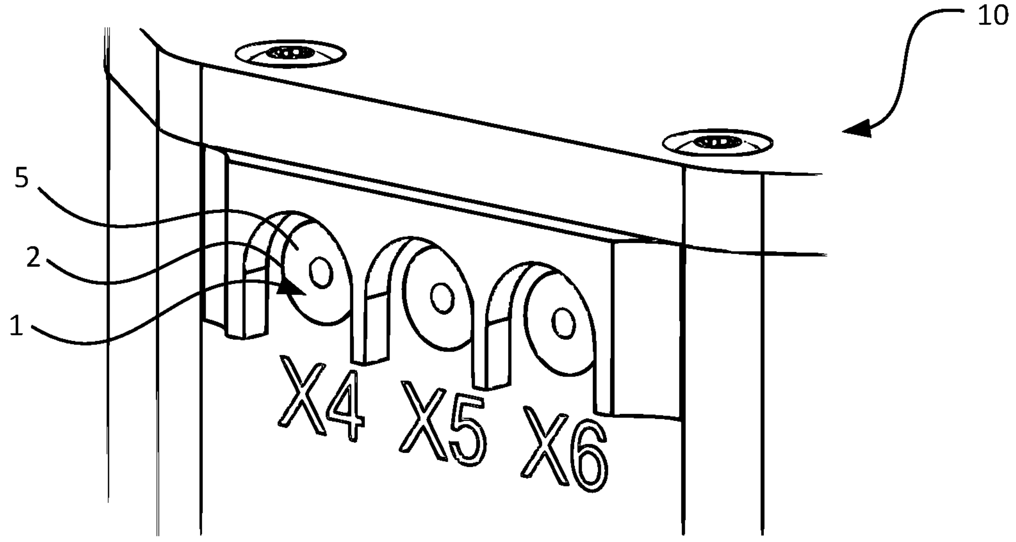
FIG. 3A illustrates a cut-out objective view of a high voltage unit with three adapters inserted into sockets of said high voltage unit
Figure 3B:
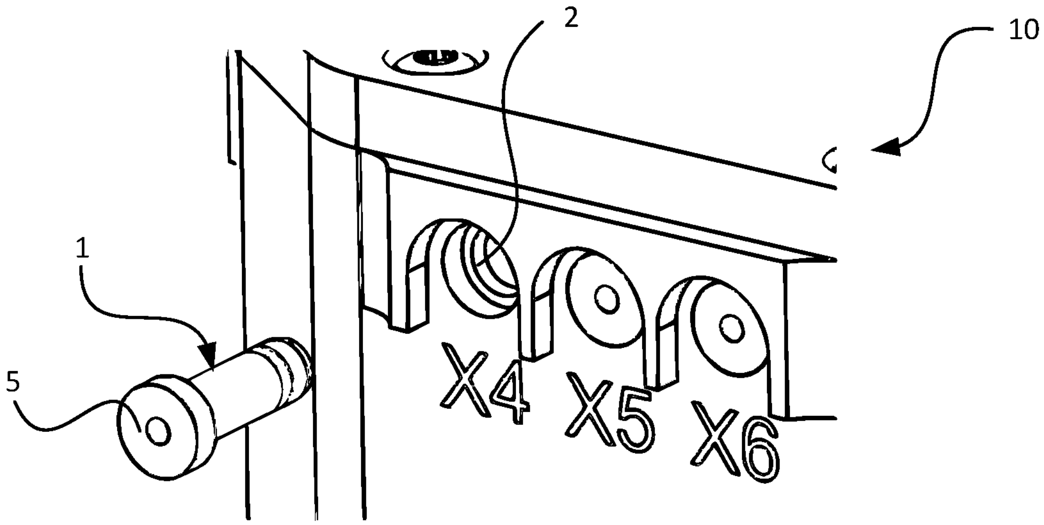
FIG. 3B illustrates a cut-out objective view of a high voltage unit with three adapters wherein two adapters are inserted into sockets of said high voltage unit

FIGS. 3A and 3B illustrates a cut-out view of a high voltage unit 10 having adapter sockets 2 wherein there is adapters 1 inserted into adapter sockets 2 of said high voltage unit 10. FIG. 3B shows one adapter socket 2 prior to receiving a third adapter 1 while having two mounted adapters 1.

Accordingly, the high voltage adapter 1 is arranged to be inserted in adapter sockets 2 of the high voltage unit 10. The adapter sockets 2 may preferably be formed in a polymer material e.g. plastic. The high voltage unit 10 may enclose a transformer or any other electrical product (shown in FIG. 5) operating with voltages of up to 20 kV, additionally the high voltage unit 10 may be filled with e.g. transformer oil. Thus, the adapters 1 may function as a hermetic seal for the transformer oil inside of the high voltage unit 10.

Figure 4A:
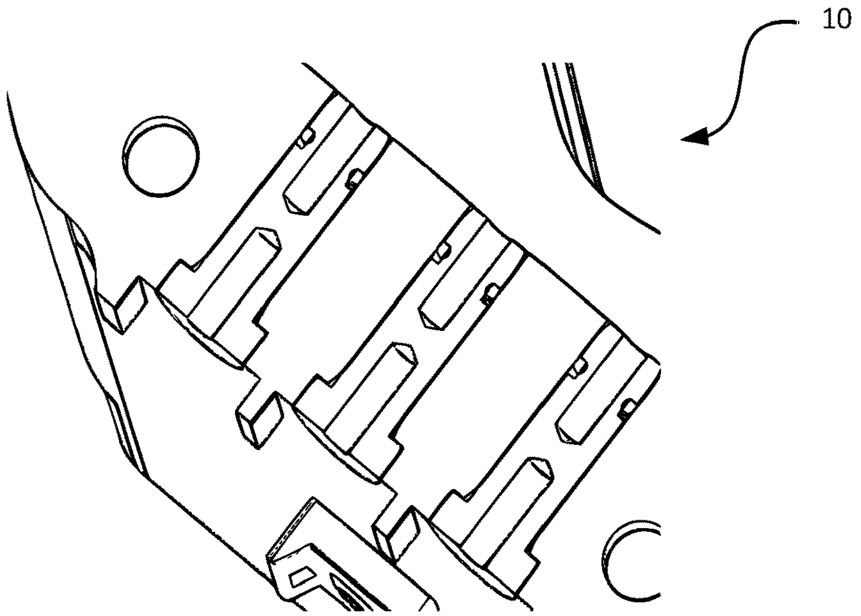
FIG. 4A illustrates a cut-out cross-sectional view of three adapters inserted into sockets of a high voltage unit

FIG. 4A illustrates a cut-out cross-sectional view of a high voltage unit 1 comprising three adapter sockets 2 with three adapters 1 inserted in said adapter sockets 2.

Figure 4B:
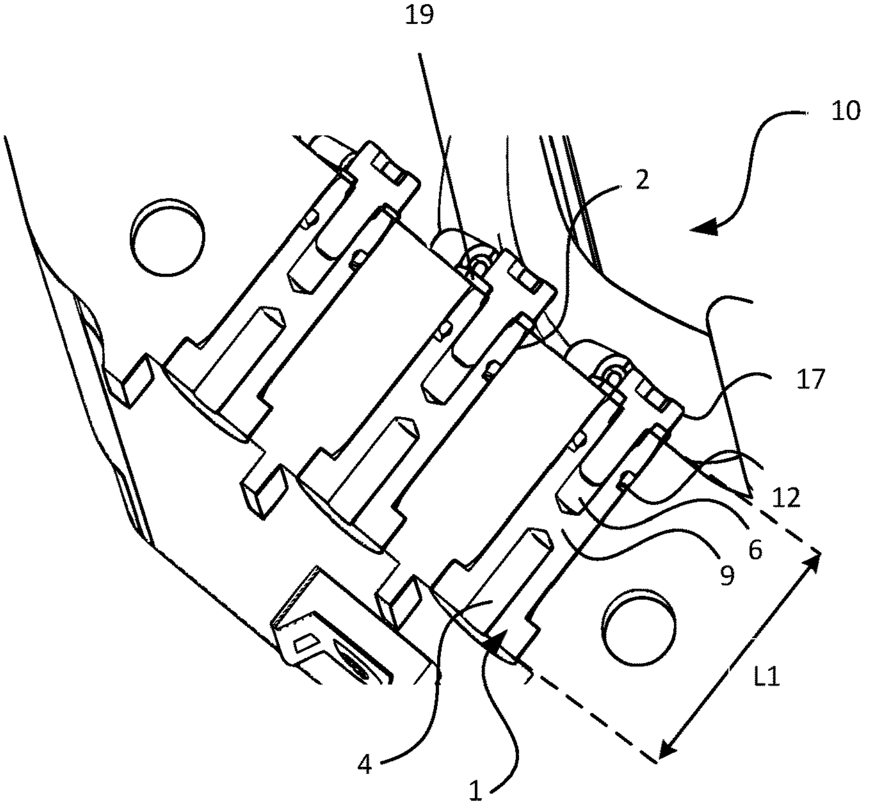
FIG. 4B illustrates a cut-out cross-sectional view of three adapters inserted into sockets of a high voltage unit, wherein a connector is fastened into female portions of said adapter

As shown in FIG. 4A-4B, the adapter 1 comprises an insertion length defining a portion of the length L1 of the adapter that is disposed within an adapter socket 2 of a high voltage unit when said adapter 1 is inserted into said adapter socket 2. In FIG. 4A-4B the insertion length is 100% of the length L1 of the adapter 1, i.e. the whole length L1 of the adapter 1 is disposed within the adapter sockets 2 of said high voltage unit 10. The insertion length of the adapter 1 may at least 90% of the length L1 of the adapter 1. Thus, the adapter 1 is configured to have at least 90% of its length L1 disposed within said adapter sockets 2 of said high voltage unit 10. This allows for a compact mounting of the adapter 1, thus, if the high voltage unit 10 may be arranged in a tight area without the adapter 1 having to occupy any excess space from other necessary components.

FIG. 4B illustrates a cut-out cross-sectional view of a high voltage unit 10 comprising three adapter sockets 2 each having a respective connector 17 within a second threaded female portion 6 of said adapter 1. As seen in FIG. 4B only the second threaded female portion 6 comprises an inserted connector 17. However, when operating, also the first threaded female portion 4 comprises an inserted connector 18 (shown in FIG. 5), such that the adapter 1 may facilitate the transfer of (voltage and/or current) signals from/to a first environment to a second environment.

FIG. 4B shows that the connector 17 comprises a cable lug 19 which is fastened by means of the connector 17 so to be in electrical contact with the adapter which allows for the transfer of signals. Accordingly a first and a second connector 17, 18 (second connector shown in FIG. 5) may be connected to opposing threaded female portions 4, 6 of each adapter 1, wherein each connector 17, 18 fastens a cable lug 19 to transfer signals from/to a first environment to/from a second environment.

Figure 5:
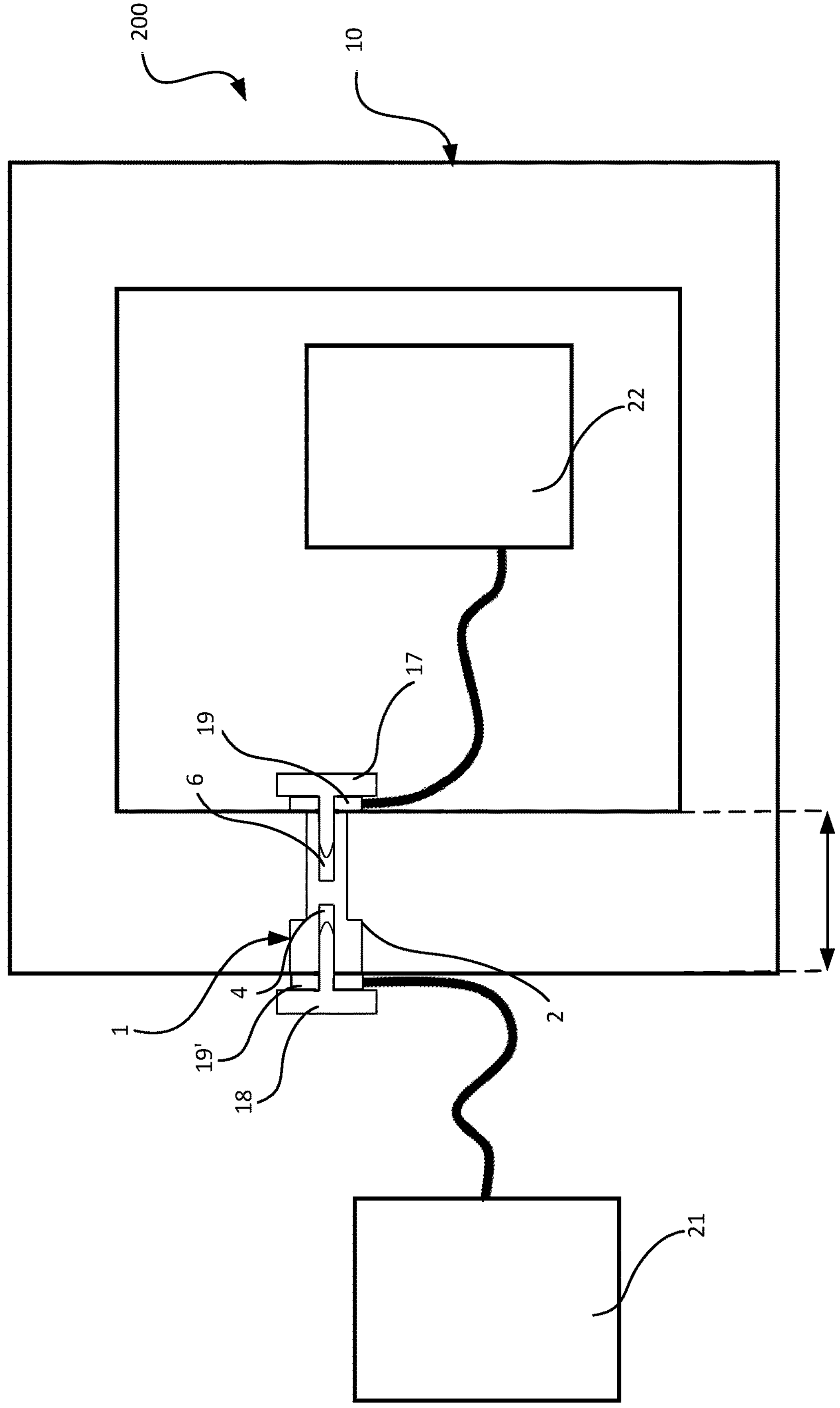
FIG. 5 illustrates a system for transferring high voltage signals from a first environment to a second environment in accordance with an embodiment of the present disclosure.

FIG. 5 illustrates a top cross-sectional view of a system 200 in accordance with an embodiment of the present disclosure.

Accordingly, FIG. 5 illustrates a system 200 comprising at least one high voltage adapter 1, a high voltage unit 10 comprising at least one adapter socket 2, at least a first and a second threaded male connector 17, 18.

The adapter 1 may be the adapter in accordance with FIGS. 1A-2B. Accordingly, it may comprise an oblong cylindrical main body 3 having a first outer diameter D1, the main body 3 comprising a first circumferential portion 3', the first circumferential portion 3' having a second outer diameter D2, wherein the second outer diameter D2 is greater than the first outer diameter D1. Further, the adapter 1 comprises a first threaded female portion 4 extending from a first base 5 of the main body 3 and a second threaded female portion 7 extending from an opposing second base 7 of the main body 3, each threaded female portion 4, 6 extending perpendicular to each corresponding base 5, 7 into the main body 3. The inner portions 4, 6 extend towards each other and are separated by an inner wall 9 (shown in FIG. 1A-1B), wherein each of the at least one adapters 1 may, by means of press-fit, arranged in said at least one adapter 2 socket of said high voltage unit 10 such that at least 90% of the length of each adapter 1 is disposed within said adapter socket 2. In FIG. 5 the whole length L1 of the adapter is disposed within said adapter socket 2.

Further, as shown in FIG. 5, the first and the second threaded male connector 17, 18 are configured to be fastened in said first and second female portion 4, 6 of the at least one adapter 1, so to transfer voltage signals from a first environment to a second environment. This is shown in FIG. 5 where a first and a second connector 17, 18 are fastened in said adapter 1. Further, a first and a second cable lug 19, 19' with connected cables are fastened so to transfer signals from a first environment to a second environment. In FIG. 5 the signals are transferred from a first component/product 21 to a second component/product 22. The first component 21 is within a first environment, the second component 22 is in a second environment. The second environment may be a liquid-filled environment. The first component 21 may be a PCB or a component on a PCB, the second product/component 22 may be a transformer unit.

Figure 6:
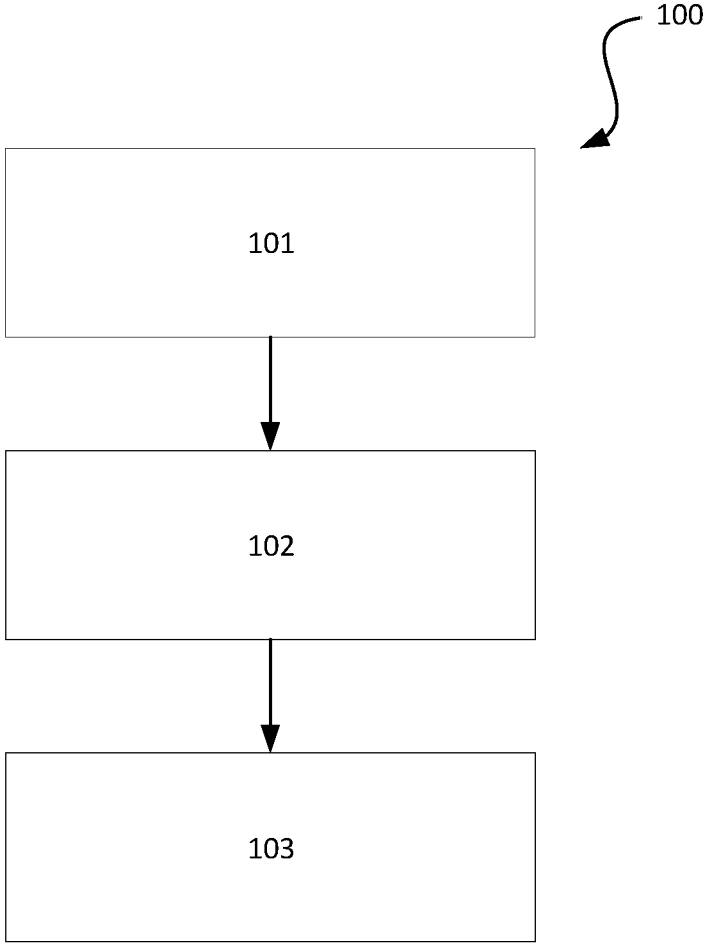
FIG. 6 illustrates a method for manufacturing a high voltage unit in accordance with an embodiment of the present disclosure.

FIG. 6 illustrates a method 100 for manufacturing a high voltage unit 10 in accordance with an embodiment of the present disclosure.

Accordingly, FIG. 6 illustrates a method 100 for manufacturing a high voltage unit comprising at least one adapter, the method comprising the steps of: providing 101 a high voltage unit comprising adapter sockets, the sockets being arranged to receive an adapter. Further, the method comprises the step of forming 102 said adapter (i.e. the adapter in accordance with the present disclosure). Furthermore, the method comprises the step of pressing/inserting 103 said adapter into said adapter socket, such that when inserted, at least 90% of a length of said adapter is disposed within said adapter socket.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The invention claimed is:

1. A high voltage adapter (1) for insertion into an adapter socket (2) in a high voltage unit (10), comprising:

an oblong cylindrical main body (3) having a first outer diameter (DI);

the main body (3) comprising a first circumferential portion (3'), the first circumferential portion (3') having a second outer diameter (D2), wherein the second outer diameter (D2) is greater than the first outer diameter (DI);

wherein the adapter (1) comprises a first threaded female portion (4) extending from a first base (5) of the main body (3) and a second threaded female portion (6) extending from an opposing second base (7) of the main body (3), each threaded female portion (4, 6) extending perpendicular to each corresponding base (5, 7) into the main body (3), wherein each threaded female portion (4, 6) is arranged to receive a threaded male connector (17, 18), so to transfer voltage signals from a first environment to a second environment;

wherein the female portions (4, 6) extend towards each other and are separated by an inner wall (9);

wherein at least a part of the first threaded female portion (4) extends within the first circumferential portion (3');

wherein the adapter (1) further comprises an insertion length defining a portion of the length (LI) of the adapter that is disposed within an adapter socket (2) of a high voltage unit (10) when said adapter (1) is inserted into said adapter socket (2); and wherein the insertion length of the adapter (1) is at least 90% of the length (LI) of the adapter (1).

2. The high voltage adapter (1) according to claim 1, wherein the adapter (1) is arranged to be inserted in the high voltage unit (10) by means of press-fit.

3. The high voltage adapter (1) according to claim 1, wherein the adapter (1) further comprises an annular cavity (12) at a second circumferential portion (3") around the main body (3), wherein the annular cavity (12) is arranged to receive a sealing means (13) to surround the circumference of said annular cavity (12).

4. The high voltage adapter (1) according to claim 1, wherein the adapter (1) is arranged to transfer voltage signals of up to 30 kV.

5. The high voltage adapter (1) according to claim 1, wherein a distance between end-points (14, 15) of the first threaded female portion (4) and the second threaded female portion (6) is 1.01-1.5 times greater than an inner diameter of the first or second threaded female portion.

6. The high voltage adapter (1) according to claim 1, wherein the adapter (1) is a metal adapter.

7. The high voltage adapter (1) according to claim 1, wherein the second outer diameter (D2) is 55-75% greater than the first outer diameter (DI).

8. The high voltage adapter (1) according to claim 1, wherein the high voltage adapter (1) is arranged to be inserted in adapter sockets (2) of a high voltage unit (10), wherein the adapter sockets (2) are formed in a polymer material.

9. A method (100) for manufacturing a high voltage unit (10) comprising at least one adapter (1), the method (100) comprising:

providing (101) a high voltage unit (10) comprising adapter sockets, the sockets being arranged to receive an adapter (1);

forming (102) said adapter, the adapter comprising;

an oblong cylindrical main body (3) having a first outer diameter (DI);

the main body (3) comprising a first circumferential portion (3'), the first circumferential portion (3') having a second outer diameter (D2), wherein the second outer diameter (D2) is greater than the first outer diameter (DI);

wherein the adapter (1) comprises a first threaded female portion (4) extending from a first base (5) of the main body (3) and a second threaded female portion (6) extending from an opposing second base (7) of the main body (3), each threaded female portion (4, 6) extending perpendicular to each corresponding base (5, 7) into the main body (3), wherein each threaded female portion (4, 6) is arranged to receive a threaded male connector (17, 18), so to transfer voltage signals from a first environment to a second environment;

wherein the female portions (4, 6) extend towards each other and are separated by an inner wall (9); and wherein at least a part of the first threaded female portion (4) extends within the first circumferential portion (3'); and inserting (103) said adapter into said adapter socket, such that when inserted, at least 90% of a length of said adapter is disposed within said adapter socket.

10. A system (200) comprising:

at least one high voltage adapter (1);

a high voltage unit (10) comprising at least one adapter socket (2);

at least a first and a second threaded male connector (17, 18);

the adapter (1) comprising;

an oblong cylindrical main body (3) having a first outer diameter (DI);

the main body (3) comprising a first circumferential portion (3'), the first circumferential portion (3') having a second outer diameter (D2), wherein the second outer diameter (D2) is greater than the first outer diameter (DI);

wherein the adapter (1) comprises a first threaded female portion extending from a first base (5) of the main body and a second threaded female portion (4) extending from an opposing second base (7) of the main body (3), each threaded female portion (4, 6) extending perpendicular to each corresponding base (5, 7) into the main body (3);

wherein at least a part of the first threaded female portion (4) extends within the first circumferential portion (3');

wherein the inner portions (4, 6) extend towards each other and are separated by an inner wall (9);

wherein each of the at least one adapters (1) are arranged in said at least one adapter socket (2) of said high voltage unit (10), wherein at least 90% of the length (LI) of each adapter (1) is disposed within said adapter socket (2);

wherein the first and the second threaded male connector (17, 18) are configured to be fastened in said first and second female portion (4, 6) of the at least one adapter (1), so to transfer voltage signals from a first environment to a second environment.

* * * * *